(12) United States Patent
Ojha

(10) Patent No.: US 9,538,577 B2
(45) Date of Patent: Jan. 3, 2017

(54) UPPER LAYER STATEFUL NETWORK JOURNALING

(75) Inventor: Anurag Ojha, Dehradun (IN)

(73) Assignee: CA, Inc., New York, NY (US)

( * ) Notice: Subject to any disclaimer, the term of this patent is extended or adjusted under 35 U.S.C. 154(b) by 273 days.

(21) Appl. No.: 13/229,983

(22) Filed: Sep. 12, 2011

(65) Prior Publication Data

US 2013/0066854 A1    Mar. 14, 2013

(51) Int. Cl.
    G06F 17/30    (2006.01)
    H04W 80/12    (2009.01)
    H04L 29/08    (2006.01)

(52) U.S. Cl.
    CPC .......... *H04W 80/12* (2013.01); *G06F 17/3089* (2013.01); *H04L 69/322* (2013.01); *G06F 17/30873* (2013.01)

(58) Field of Classification Search
    CPC ................ G06F 17/3089; G06F 3/0484; G06F 17/30873; H04L 69/322; H04W 80/12
    USPC ........................................................ 707/722
    See application file for complete search history.

(56) References Cited

U.S. PATENT DOCUMENTS

| | | | | |
|---|---|---|---|---|
| 6,108,782 A * | 8/2000 | Fletcher | ................... | G06F 8/65 370/245 |
| 6,449,350 B1 * | 9/2002 | Cox | ..................... | H04Q 3/0091 379/112.03 |
| 8,185,828 B2 * | 5/2012 | Liu | ........................ | G06Q 10/10 715/753 |
| 8,250,150 B2 * | 8/2012 | Beck | .................... | G06Q 10/107 709/206 |
| 2003/0126230 A1 * | 7/2003 | Donatelli | ................ | H04L 29/06 709/217 |
| 2007/0055942 A1 * | 3/2007 | Hesmer et al. | ................ | 715/742 |
| 2008/0059542 A1 * | 3/2008 | Atluri et al. | ................... | 707/204 |
| 2008/0163357 A1 * | 7/2008 | Xiao | ..................... | H04L 63/104 726/15 |
| 2009/0100372 A1 * | 4/2009 | Lauridsen et al. | ............. | 715/781 |
| 2011/0004868 A1 * | 1/2011 | Bharadwaj | .......... | G06F 11/3676 717/135 |
| 2011/0153811 A1 * | 6/2011 | Jeong et al. | ................... | 709/224 |
| 2012/0036552 A1 * | 2/2012 | Dare et al. | ........................ | 726/1 |
| 2012/0324575 A1 * | 12/2012 | Choi et al. | ....................... | 726/23 |
| 2013/0238535 A1 * | 9/2013 | Leppanen | ............ | G06N 99/005 706/12 |

* cited by examiner

*Primary Examiner* — Tuan A Pham
*Assistant Examiner* — Merilyn Nguyen
(74) *Attorney, Agent, or Firm* — Gilliam IP PLLC

(57) ABSTRACT

A system includes a computer processor that is configured to implement an upper layer stateful application network journaling process. The process includes recording and managing individual client actions on each server in a network. The recording and managing of the individual client actions executes at an application layer of a network protocol stack of the network. The process also includes recording and managing a server status snapshot on a per client basis. The recording and managing of the server status snapshot executes at the application layer of the network protocol stack of the network.

17 Claims, 5 Drawing Sheets

UPPER LAYER STATEFUL NETWORK JOURNALING

TECHNICAL FIELD

The present disclosure relates to network journaling, and in an embodiment, but not by way of limitation, upper layer stateful network journaling.

BACKGROUND

Data access service level agreements (SLA) are a prominent customer need and customer request in virtualization. These SLAs normally detail the operation of a system and the maximum amount of time that data will be unavailable in the event of a network or other outage. Consequently, there is a need to restore system states and to do so in a time specified by contractual SLAs.

SUMMARY

A system, a process, and a computer readable medium that includes instructions for a process, implement an upper layer stateful application network journaling process. The upper layer stateful application network journaling process includes recording and managing individual client actions on each server in a network. The recording and managing of the individual client actions executes at an application layer of a network protocol stack of the network. The upper layer stateful application network journaling process further includes recording and managing a server status snapshot on a per client basis. The recording and managing of the server status snapshot executes at the application layer of the network protocol stack of the network.

DETAILED DESCRIPTION

Figure 1:
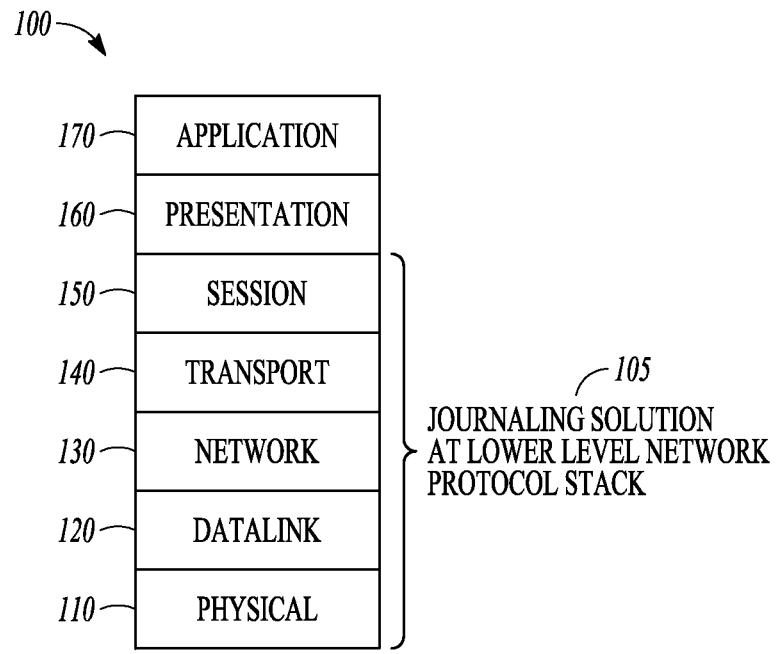
FIG. 1 illustrates a network protocol stack, and the locations within the network protocol stack wherein journaling solutions execute.

Typical journaling solutions work at lower levels of the protocol or network stack. For example, as illustrated in FIG. 1, a typical network protocol stack 100 includes a physical layer 110, a datalink layer 120, a network layer 130, a transport layer 140, a session layer 150, a presentation layer 160, and an application layer 170. As indicated at 105, network journaling solutions currently known in the art execute at the physical layer 110, the datalink layer 120, the network layer 130, the transport layer 140, and/or the session layer 150.

Figure 2:
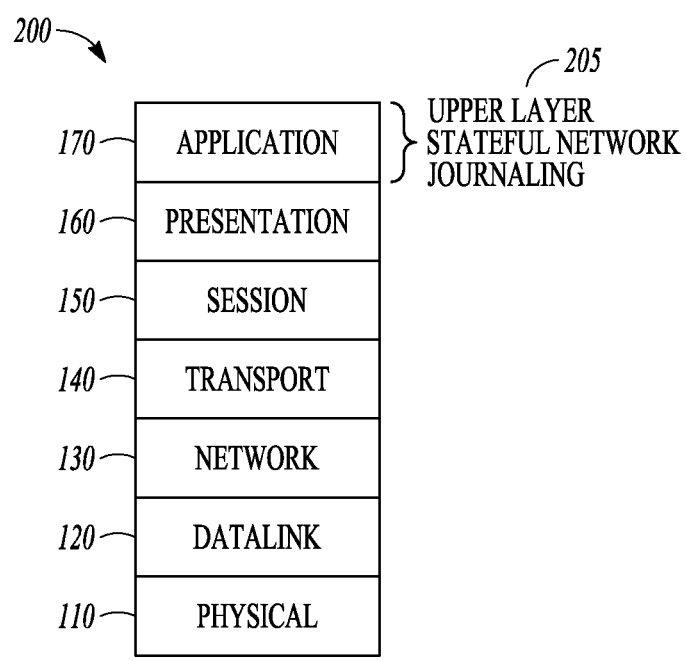
FIG. 2 illustrates a network protocol stack, and the location within the network protocol stack wherein a journaling solution of the present disclosure executes.

An approach implemented by the current disclosure, which can be referred to as upper layer stateful network journaling, or simply stateful network journaling, is illustrated in FIG. 2. The system 200 of FIG. 2, like that of the system of FIG. 1, includes a physical layer 110, a datalink layer 120, a network layer 130, a transport layer 140, a session layer 150, a presentation layer 160, and an application layer 170. However, unlike the system of FIG. 1, and as illustrated at 205 in FIG. 2, the system 200 of FIG. 2 implements the network journaling at the application layer 170. The system 200 of FIG. 2 allows for an intelligent suite of marketable solutions to be made possible, but very distinctly at the application layer of the protocol stack, thus facilitating many innovative customer-visible solutions. For example, with stateful network journaling that executes at the application layer 170, a customer can maintain a stateful inspection state table of application layer transactions, thereby allowing the customer to keep track of all open connections at layer 7 of OSI systems. Such a customer feature could not be easily implemented in prior journaling systems because typical journaling solutions work at lower levels of the protocol or network stack, to which a customer does not have access. The approach with stateful application network journaling allows for an intelligent suite of marketable solutions, and very distinctly solutions at the application layer of the protocol stack, thus facilitating many innovative customer-visible solutions.

A stateful network journaling functionality as implemented by a system such as system 200 of FIG. 2 allows a virtualization engine to record and manage layer 7 protocol level client and server states with a view to satisfying customer requirements within an SLA. The stored states would include the spectrum of basic metadata, full metadata, or full meta-data and file payload data. This technology is applicable to data security and a host of other data services. Specifically, as explained in more detail below, stateful network journaling can be used in connection with data security management, data synchronization, and recovery from data loss and network outages.

Figure 3:
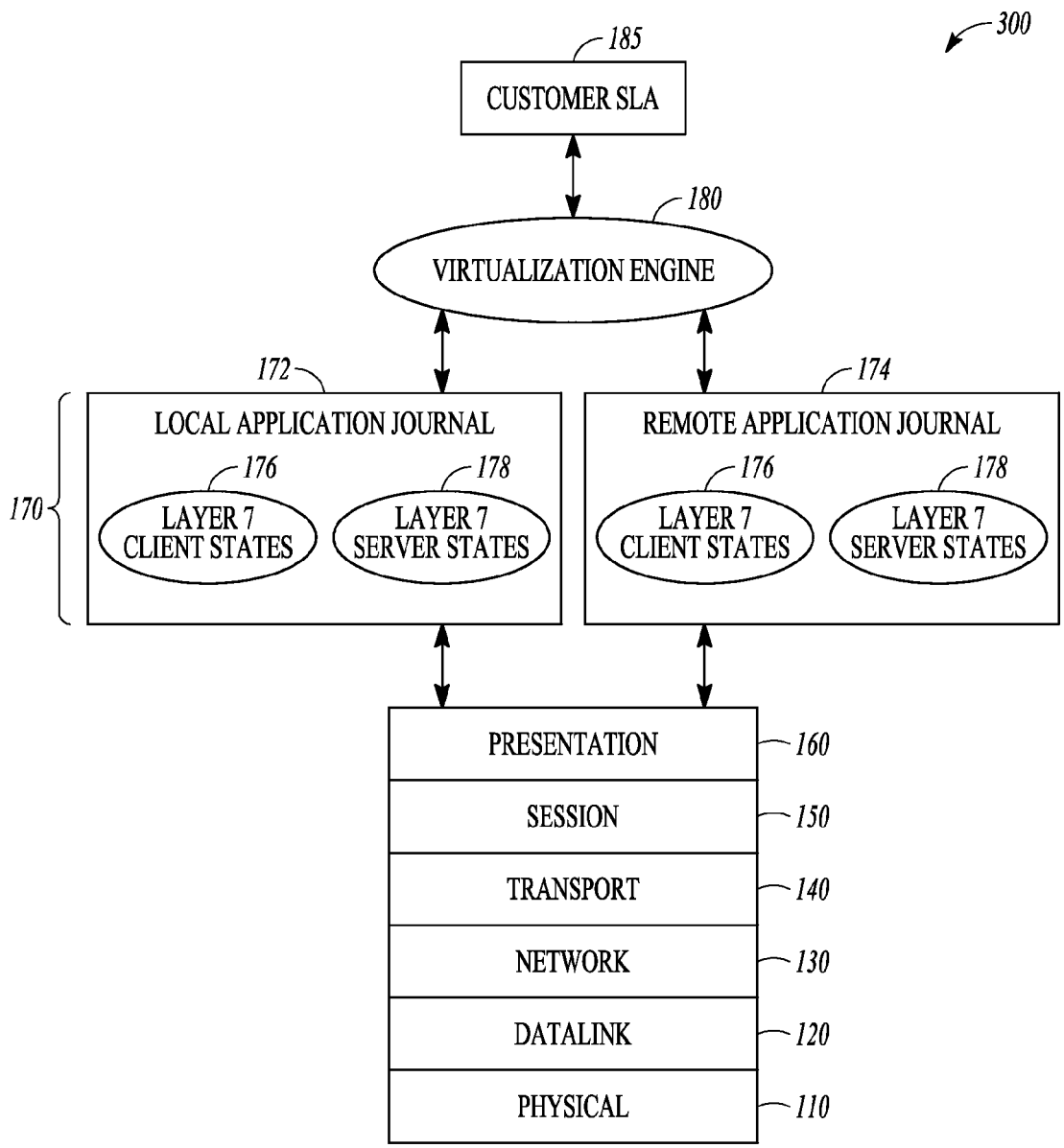
FIG. 3 is a block diagram of an embodiment wherein network journaling executes at an upper level or application layer of a network protocol stack.

FIG. 3 illustrates in further detail a system 300 that implements stateful network journaling. The system 300 includes the physical layer 110, the datalink layer 120, the network layer 130, the transport layer 140, the session layer 150, and the presentation layer 160, as do the systems 100 and 200 of FIGS. 1 and 2 respectively. FIG. 3 illustrates the application layer 170 in further detail. Specifically, FIG. 3 illustrates a virtualization engine 180 that executes on and/or communicates with the application layer 170. The application layer 170 includes a local application journal 172 and a remote application journal 174. Both the local application journal 172 and the remote application journal 174 include layer 7 client states 176 and layer 7 server states 178. As discussed in detail below, the virtualization engine 180 can be used to support customer service level agreements (SLA) 185, and further can be used in connection with data security management, data synchronization, and recovery from data loss and network outages.

Figure 4:
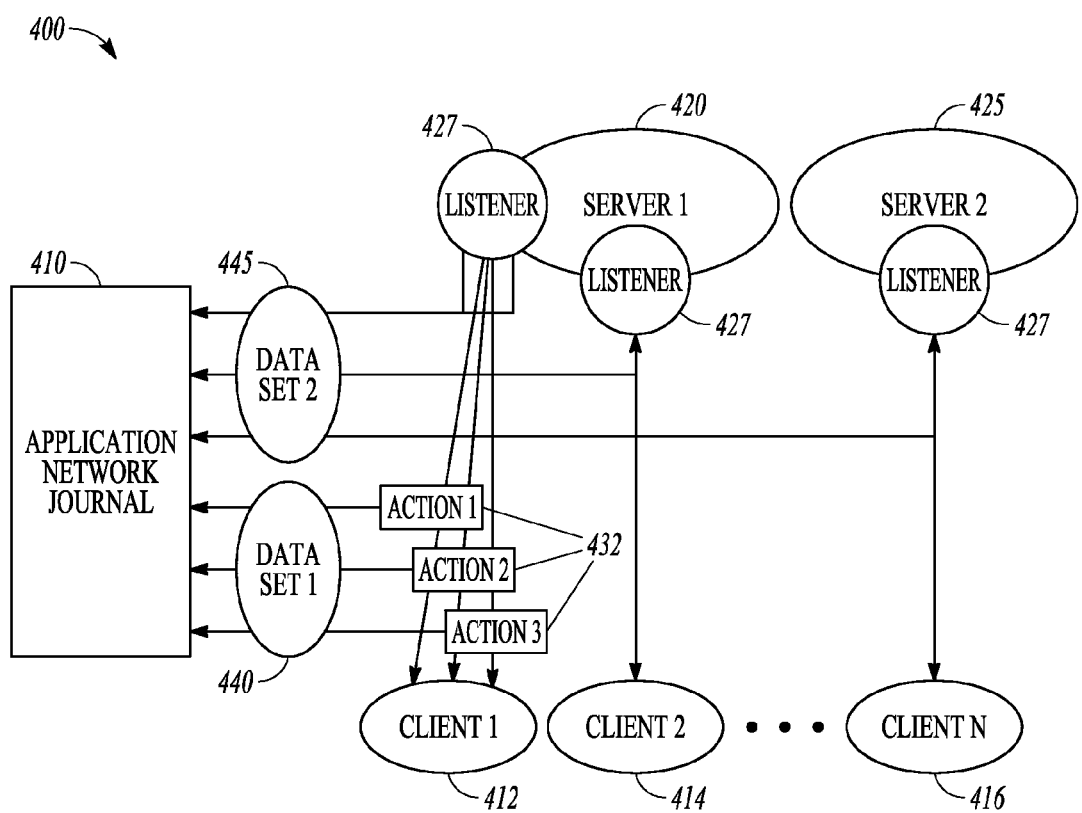
FIG. 4 is a block diagram illustrating an embodiment of network journaling that records individual client actions on a per server basis and server snapshots on a per client basis.

FIG. 4 illustrates a system 400 for maintaining a network journal 410. The system 400 includes clients 412, 414, and 416, and servers 420 and 425. Each server 420, 425 includes one or more listener modules 427 that record actions 432 of a particular client on a particular server, and that further record server snapshots of the servers 420, 425. The recorded actions of a user are stored in a first dataset 440, and the snapshots of a server are stored in a second dataset 445. The two datasets make up the network journal 410, and the network journal 410 can be used to carry out the requirements of a customer SLA 185 in connection with data security management, data synchronization, and recovery from data loss and network outages.

Figure 5:
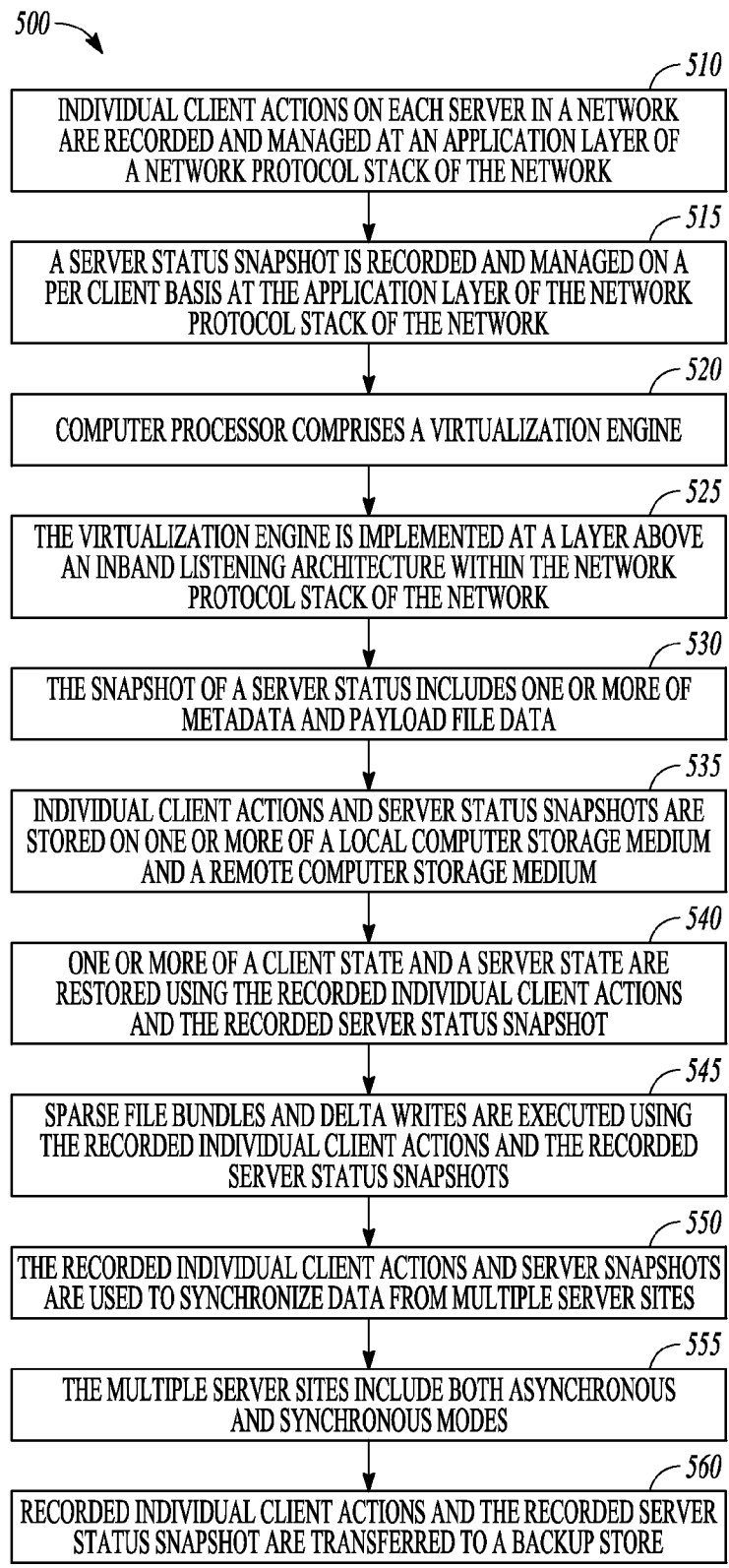
FIG. 5 is a diagram of an example embodiment of a process and features of the process to implement network journaling at an upper layer of a network protocol stack.

FIG. 5 illustrates a process 500 and features of the process 500 that implement network journaling at an upper layer of a network protocol stack. FIG. 5 includes a number of process blocks 505-560. Though arranged serially in the example of FIG. 5, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring to FIG. 5, at 510, individual client actions on each server in a network are recorded and managed at an application layer of a network protocol stack of the network. Examples of client actions that can be recorded are a read of data from a database into volatile memory, a write of data to a database on a disk drive, and a connection and communication with a particular server. The managing of these client actions can include such things as getting detailed information about client connections, noting client responses to different types of server requests via different types of servers, maintaining compliance reporting, implementing software management, and implementing software patch management. At 515, a server status snapshot is recorded and managed on a per client basis at the application layer of the network protocol stack of the network. The data that can be recorded on a per client basis relate to databases that a client has read from and/or written to, and times and durations that a client has been connected to and in communication with a particular server. The management of the server information or snapshot on a per client basis can include such things as maintaining client configurations, recording responses from various clients, noting server requests, noting average response time, noting mean time between failures, noting a useful lift period, and noting a wear out period.

At 520, the computer processor comprises a virtualization engine, such as the virtualization engine 180 in FIG. 3. The virtualization engine 180 is within band of the application layer 170 of the network protocol stack of the network. That is, the virtualization engine 180 sits in the flow of network traffic and provides improved security, greater functionality, and improved performance. At 525, the virtualization engine is implemented at a layer above an inband listening architecture within the network protocol stack of the network. The listening architecture can include a module that records all the actions of a particular user or users, and records snapshots of a server on a per client basis.

At 530, the snapshot of a server status includes one or more of metadata and payload file data. In an embodiment, metadata can be used to discover resources, authenticate data and users, authorize users, implement accounting functions, implement faster interoperation, recover clients in case of disruption of service on the client or server side, implement faster searching, avoid duplication, improve efficiency, and assure compliance (with an SLA for example). The payload data is of course used by the user for whatever purpose the data is meant to serve.

At 535, individual client actions and server status snapshots are stored on one or more of a local computer storage medium and a remote computer storage medium. The advantages to storing the client actions and server status snapshots on separate storage media include improved reliability and availability, improved scalability, less chance of data loss, less chance of downtime, improved compliance, improved regulatory responses, decreased amount of information sent to clients and/or servers, improved error handling, the ability to view the state of the network stack, the ability to control the state of the network stack, improved use of cookies, improved execution of application and session states, and improved use of profiles.

At 540, one or more of a client state and a server state are restored using the recorded individual client actions and the recorded server status snapshot. Specifically, a client state can be restored by examining the client database to determine for example what data the client has read into memory from what database, and then restoring that data to memory. Similarly, the server snapshot database can be examined to determine what clients are connected to what server ports, the server data that the client has accessed or modified, and using this server snapshot data to restore the server status. As noted previously, the client state and server state restorations occur at the layer 7/application layer level.

At 545, sparse file bundles are created and delta writes are executed using the recorded individual client actions and the recorded server status snapshots. This feature reduces the storage space required, since storage space is allocated only when required. Additionally, the sparse file bundles and delta writes involve bands instead of files, and further they contain mountable directories. This feature also contributes to enhanced security.

At 550, the recorded individual client actions and server snapshots are used to synchronize data from multiple server sites. This feature is implemented by using a timeline of when particular client actions are executed and particular server states exist. In an embodiment, for example, if an operator knows that particular client actions and/or server states were uncorrupted as of a certain time, all server sites can be restored to that particular time, thereby restoring an uncorrupted system. As noted previously, the restoration is not limited to lower layers but executes across all levels. Additionally, it executes much faster since it involves higher level data and/or meta data.

At 555, the multiple server sites include asynchronous, synchronous, and semi-synchronous modes, which can take care of processes, dependencies, and transactions that operate in lockstep or completely independent of other processes, dependencies, and/or transactions, and further can take care of systems that start at the same time but then gradually become dependent.

At 560, recorded individual client actions and the recorded server status snapshot are transferred to a backup store. The backing up of client actions and server statuses can be useful when the working copies of such data become corrupted.

As noted above, in an embodiment, a virtualization appliance or engine records and manages two sets of data states in a locally stored or remotely stored network journal. A first data set records and manages individual client actions on each server. Another data set records and manages server snapshots on a per client basis. The virtualization engine then has access to both client actions and to server states because the engine is inband. Additionally, an implementation of stateful network journaling is layered above an existing inband listening architecture.

The functionality of stateful network journaling can be used in connection with the following range of technology solutions. The stateful network journal can be used to recover client statuses or server snapshots. That is, if a client machine or server goes down, upon reboot, one or more of the layer 7 client states 176 and the layer 7 server states 178 can be used to restore the client and/or server. The stateful network journal can also be used to support sparse file bundles and delta writes. Specifically, the stateful network journal can help in creating efficient sparse file bundles (it is faster to reclaim unused free space in a sparse bundle than in an equivalent sparse image). This capability of stateful network journaling allows one to refrain from copying entire files, thereby saving system resources. The stateful network journal is useful in supporting multiple destination sync mirrors and the syncing of data to multiple sites (some being synchronous, others being asynchronous or semi-synchronous).

The stateful network journaling can facilitate asynchronous backup. With an asynchronous backup, client traffic is not synced, but is stored in the stateful network journal. Then hourly or daily, the journal can be flushed to the backup node. This further supports asynchronous sync mirroring.

Stateful network journaling can also be used in connection with fine grained security tracking. Specifically, the network journal can be inspected to gather information about changes made to data. For example, if an application has modified data, the journal capturing the $7^{th}$, $6^{th}$, $5^{th}$, $4^{th}$, and $3^{rd}$ layer of the OSI stack would be able to provide information at all of these five levels. Additionally, the $7^{th}$ layer would provide more information at that layer, for example, who changed the data, what changed the data, why was the data changed, when was the data changed, and how was the data changed.

Stateful network journaling can also be used in connection with the management of active-active clustering, since stateful network journaling can use homogeneous configurations and do load balancing of traffic. Application layer journaling is helpful in doing load balancing based on applications and its stateful data.

Stateful network journaling can also be used for fine grained debugging. Stateful network journaling is more easily parse-able to track accesses to a file, thereby aiding debugging, since there is required data across layers, and in particular, there is a lot of data in the application layer. Additionally, if required, the data and meta data can be filtered based on requirements of reviewing and debugging and the same can be analyzed.

Stateful network journaling can also be used to support a redundant array of independent servers and help in providing extended availability and protection of data by reducing recovery time, especially for large arrays of data, in case of any disruption by using application layer restart vectors. This also improves the input/output rate.

Figure 6:
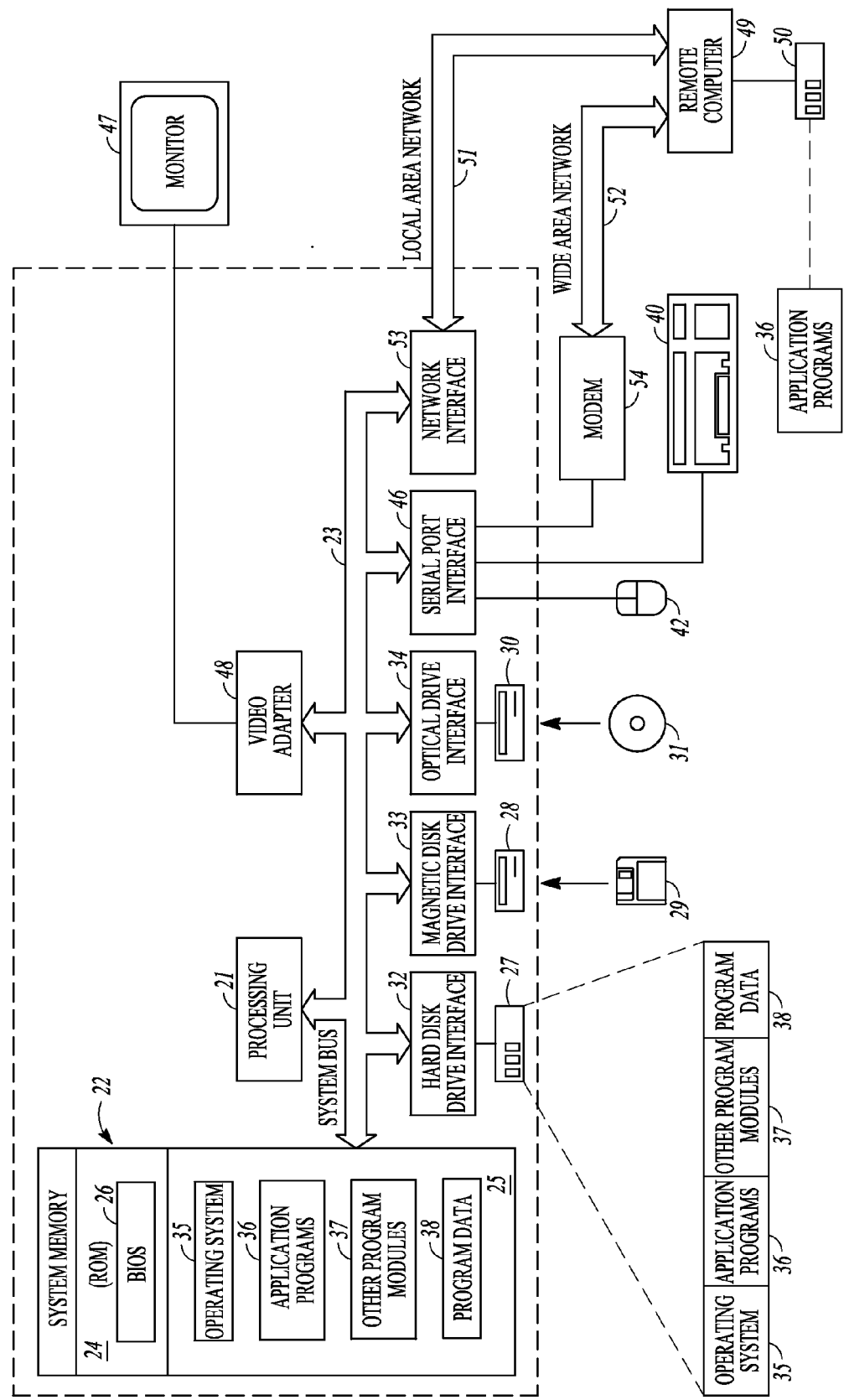
FIG. 6 is a block diagram of a computer system upon which one or more embodiments of the current disclosure can execute.

FIG. 6 is an overview diagram of a hardware and operating environment in conjunction with which embodiments of the invention may be practiced. The description of FIG. 6 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 6, a hardware and operating environment is provided that is applicable to any of the servers and/or remote clients shown in the other Figures.

As shown in FIG. 6, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 6 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Thus, an example system, method and machine readable medium for upper layer stateful network journaling have been described. Although specific example embodiments have been described, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A system comprising:
   a computer processor configured to implement an upper layer stateful application network journaling process by:
      recording in a memory and managing individual client actions on each server in a network, the recording and managing of the individual client actions executing at an application layer of a network protocol stack of the network wherein such individual client actions are recorded in a client action data set on a per client basis; and
      recording and managing a server status snapshot on a per client basis, the recording and managing of the server status snapshot executing at the application layer of the network protocol stack of the network wherein each server status snapshot is recorded in a server status snapshot data set on a per client basis;
      wherein the recording and managing of the individual client actions and the server status snapshot at the application layer of the network protocol stack permits a network application layer analysis and the ability to restore both servers and clients, wherein the network application layer analysis comprises use of a user-maintained stateful inspection state table of application layer transactions; and wherein the computer processor is configured to store system user traffic in connection with the recording and managing of the individual client actions and the server status snapshot at the application layer of the network protocol stack, and to use the stored system user traffic in an asynchronous backup by transmitting the data to a backup node on a periodic basis.

2. The system of claim 1, wherein the computer processor comprises a virtualization engine, and wherein the virtualization engine is within band of the application layer of the network protocol stack of the network, wherein the network protocol stack comprises a physical, datalink, network, transport, session, presentation and application layer.

3. The system of claim 2, wherein the virtualization engine is implemented at a layer above an inband listening architecture within the network protocol stack of the network.

4. The system of claim 1, wherein the computer processor comprises a server having a listener module that records action of clients and server status snapshots at the application layer of the network protocol stack, and where each server status snapshot includes one or more of metadata and payload file data.

5. The system of claim 1, wherein the computer processor is configured to restore one or more of a client state and a server state using the recorded individual client actions and the recorded server status snapshot.

6. The system of claim 1, wherein the computer processor is configured to synchronize data from multiple server sites.

7. The system of claim 1, wherein the computer processor is configured to execute debugging using the recorded individual client actions and the server status snapshot at the application layer of the network protocol stack, thereby permitting debugging across layers of the network protocol stack.

8. A non-transitory computer readable medium comprising instructions that when executed by a processor execute an upper layer stateful application network journaling process by:

recording and managing individual client actions on each server in a network, the recording and managing of the individual client actions executing at an application layer of a network protocol stack of the network wherein such individual client actions are recorded in a client action data set on a per client basis; and recording and managing a server status snapshot on a per client basis, the recording and managing of the server status snapshot executing at the application layer of the network protocol stack of the network wherein each server status snapshot is recorded in a server status snapshot data set on a per client basis;

wherein the recording and managing of the individual client actions and the server status snapshot at the application layer of the network protocol stack permits a network application layer analysis, wherein the network application layer analysis comprises use of a user-maintained stateful inspection state table of application layer transactions; and wherein the computer processor is configured to execute security tracking, using the recorded individual client actions and the server status snapshot at the application layer of the network protocol stack, by identifying a system user who changed particular data, a device that changed the particular data, a reason the particular data was changed, a time that the particular data was changed, and a manner in which the particular data was changed.

9. The non-transitory computer readable medium of claim 8, wherein the recording and managing individual client actions on each server and the recording and managing a server status snapshot on a per client basis execute within band of the application layer of the network protocol stack of the network.

10. The non-transitory computer readable medium of claim 8, wherein the individual client actions and the server status snapshot are stored on one or more of a local computer storage medium and a remote computer storage medium.

11. The non-transitory computer readable medium of claim 8, comprising instructions to restore one or more of a client state and a server state using the recorded individual client actions and the recorded server status snapshot.

12. The non-transitory computer readable medium of claim 8, comprising instructions to synchronize data from multiple server sites.

13. A process comprising:

recording in a memory and managing individual client actions on each server in a network, the recording and managing of the individual client actions executing at an application layer of a network protocol stack of the network wherein such individual client actions are recorded in a client action data set on a per client basis; and recording and managing a server status snapshot on a per client basis, the recording and managing of the server status snapshot executing at the application layer of the network protocol stack of the network wherein each server status snapshot is recorded in a server status snapshot data set on a per client basis;

wherein the recording and managing of the individual client actions and the server status snapshot at the application layer of the network protocol stack permits network application layer analysis, wherein the network application layer analysis comprises use of a user-maintained stateful inspection state table of application layer transactions; and wherein the computer processor is configured to store system user traffic in connection with the recording and managing of the individual client actions and the server status snapshot at the application layer of the network protocol stack, and to use the stored system user traffic in an asynchronous backup by transmitting the data to a backup node on a periodic basis.

14. The process of claim 13, wherein the recording and managing individual client actions on each server and the recording and managing a server status snapshot on a per client basis execute within band of the application layer of the network protocol stack of the network.

15. The process of claim 13, wherein the individual client actions and the server status snapshot are stored on one or more of a local computer storage medium and a remote computer storage medium.

16. The process of claim 13, comprising restoring one or more of a client state and a server state using the recorded individual client actions and the recorded server status snapshot.

17. The process of claim 13 comprising synchronizing data from multiple server sites.

* * * * *